June 11, 1935. C. P. BROCKWAY 2,004,267
METHOD AND APPARATUS FOR IMPREGNATING BRAKE LININGS
Filed Dec. 29, 1930   6 Sheets-Sheet 1

INVENTOR
CARL P. BROCKWAY
BY
ATTORNEY

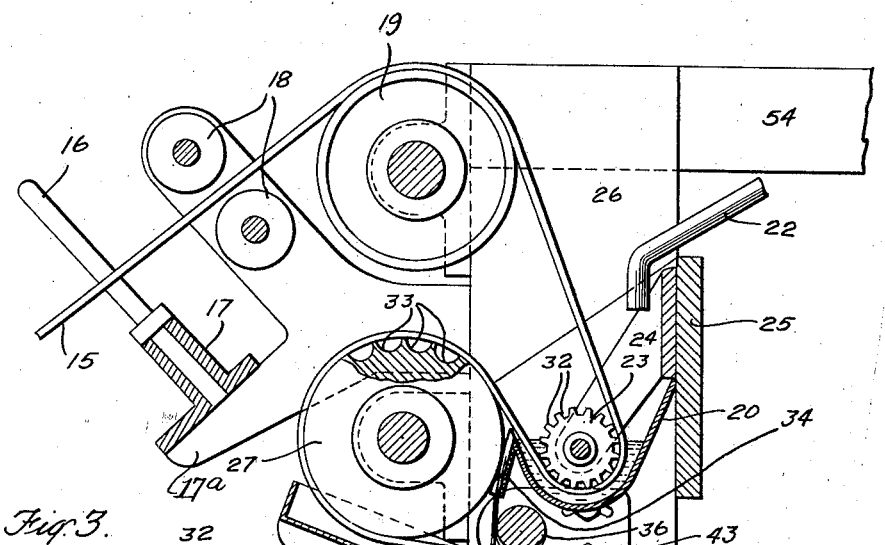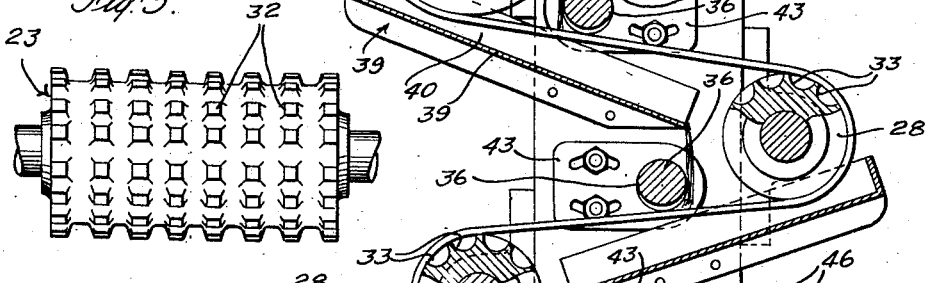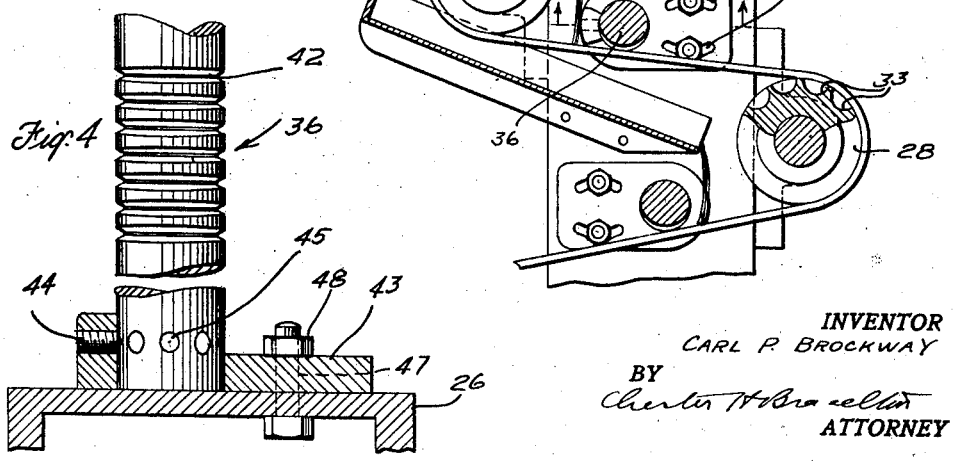

INVENTOR
CARL P. BROCKWAY
BY
ATTORNEY

June 11, 1935. C. P. BROCKWAY 2,004,267
METHOD AND APPARATUS FOR IMPREGNATING BRAKE LININGS
Filed Dec. 29, 1930 6 Sheets-Sheet 4
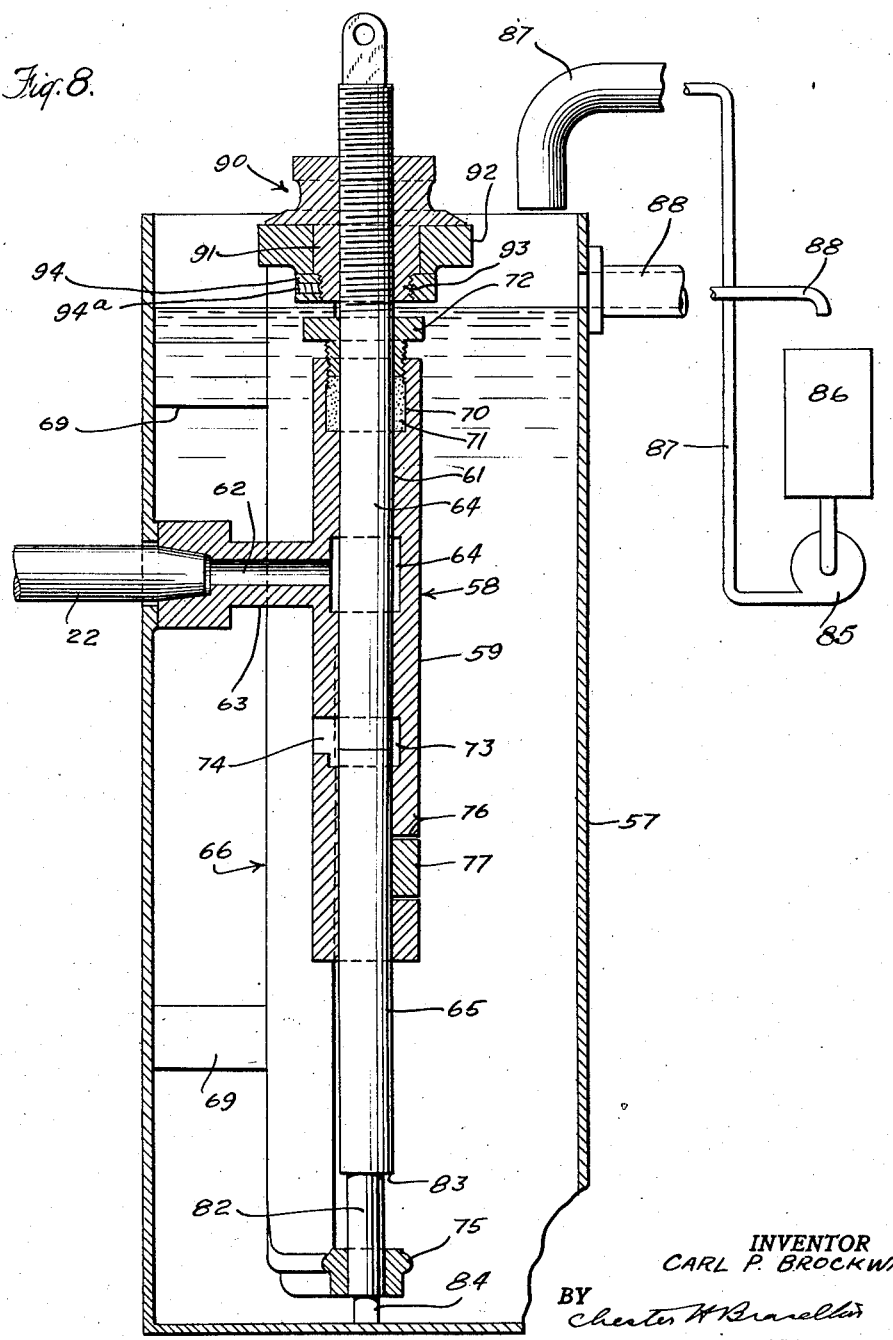
INVENTOR
CARL P. BROCKWAY
BY
ATTORNEY June 11, 1935.  C. P. BROCKWAY  2,004,267
METHOD AND APPARATUS FOR IMPREGNATING BRAKE LININGS
Filed Dec. 29, 1930  6 Sheets-Sheet 5
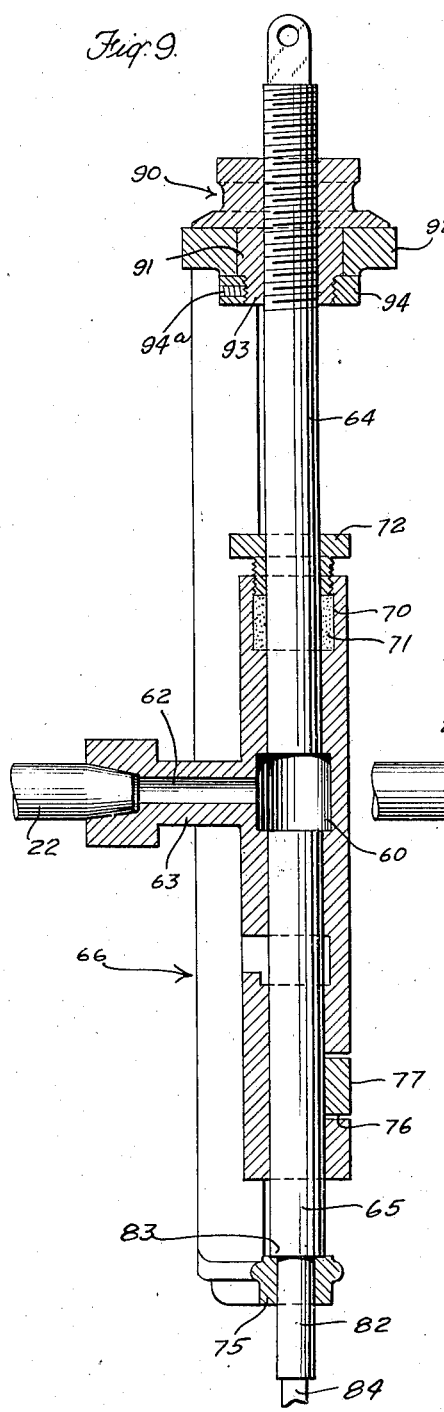
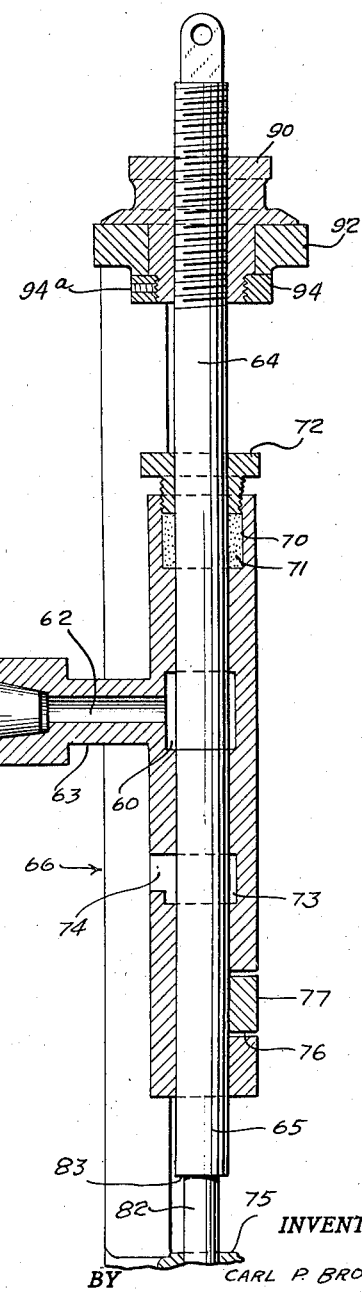
INVENTOR
CARL P. BROCKWAY.
BY Charles H. Bracelen
ATTORNEY June 11, 1935.  C. P. BROCKWAY  2,004,267
METHOD AND APPARATUS FOR IMPREGNATING BRAKE LININGS
Filed Dec. 29, 1930  6 Sheets-Sheet 6

INVENTOR
CARL P. BROCKWAY
BY
Chester W Bracelen
ATTORNEY

UNITED STATES PATENT OFFICE 2,004,267

METHOD AND APPARATUS FOR IMPREGNATING BRAKE LININGS

Carl P. Brockway, Ridgewood, N. J., assignor to World Bestos Corporation, Paterson, N. J., a corporation of Delaware Application December 29, 1930, Serial No. 505,253

8 Claims. (Cl. 91—32)

The present invention relates to a method and apparatus for impregnating brake lining or the like, and more particularly brake lining formed of strands of asbestos material reinforced in any suitable manner.

An important object of the invention is to provide a method whereby uniform impregnation of brake lining or the like may be effected. Another object is to provide apparatus whereby such uniform impregnation may be obtained.

Other objects of the invention are to provide novel means for supplying the impregnating liquid at a measured rate; means for spreading the impregnating material over the brake lining; means for assuring substantially complete use of all the impregnating material; and means for supplying the brake lining and the impregnating material in synchronized relation so that at all times the proper amount of impregnating material will be applied to the brake lining.

Other objects and advantages will appear upon consideration of the following description and of the drawings, in which Fig. 1 is a side elevation of a preferred embodiment of the invention;

Fig. 2 is a fragmentary view on a larger scale of the structure shown in Fig. 1, one end frame of the machine being removed and parts being shown in section or broken away to show the structure clearly;

Fig. 3 is a front elevation of a treatment roller which determines the path of the brake lining in its passage through a trough containing impregnating material;

Fig. 4 is a fragmentary view illustrating one of the spreading devices and adjusting means therefor;

Fig. 8 is a sectional view taken in a plane through the axis of one of the pump elements and through its outlet, the pump elements being shown in the positions assumed thereby at the end of a downward stroke.

Fig. 9 is a view showing the relative positions of the parts of a pump element at the end of the upward stroke;

Fig. 10 shows the position of the parts of a pump unit when the pump in its downward stroke has forced the liquid therefrom.

Figure 1:
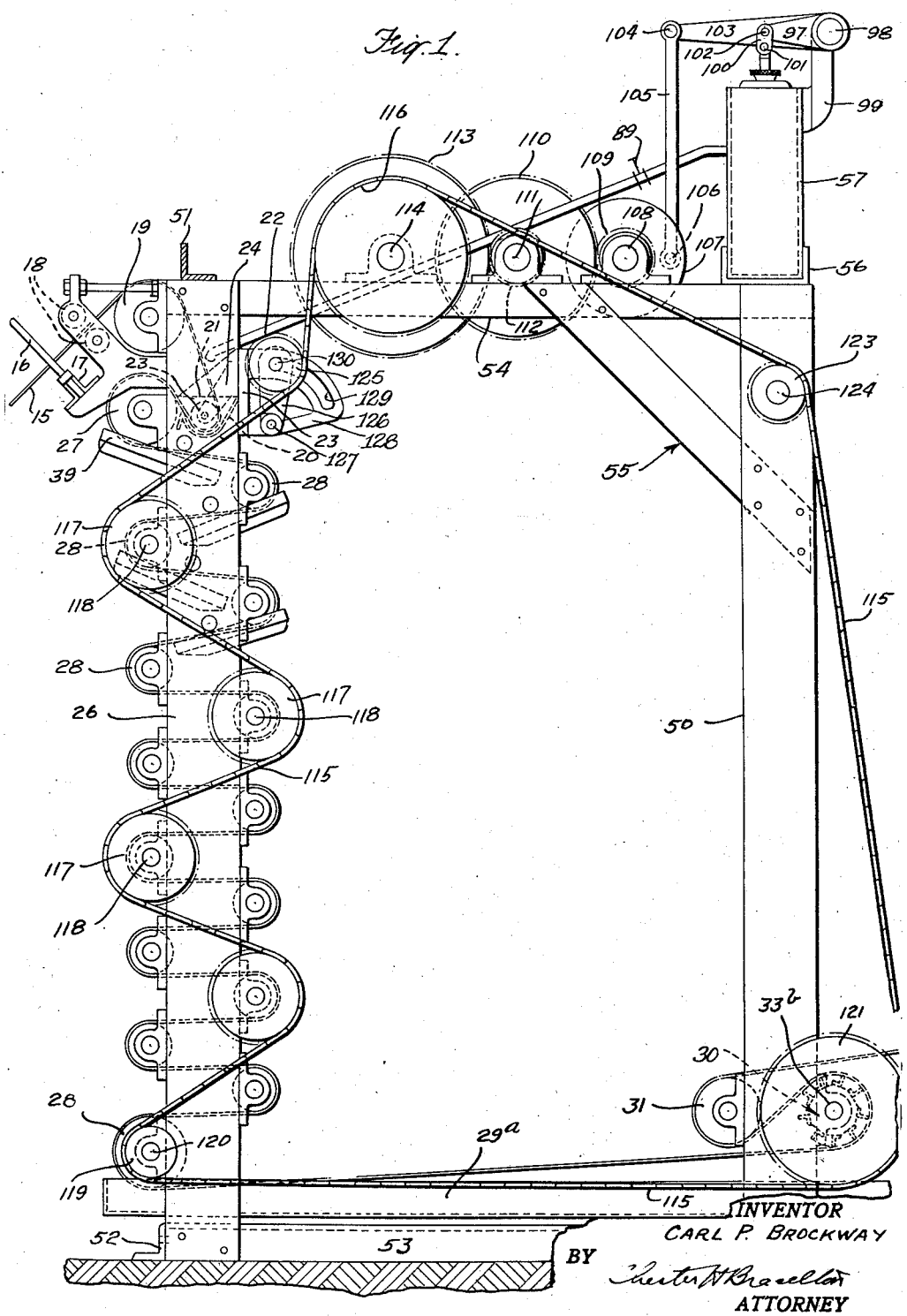

According to the preferred form of carrying out the invention, one or more brake lining strips are drawn from a suitable source of supply; passed around the bottom of a suitable roller in a trough containing impregnating liquid; carried back and forth around rollers and over drip pans until all of the impregnating liquid is taken up; and advanced along any desired path by means including a driving reel, and discharged for later treatment as by heating and drying. The impregnating material is fed to the trough by pumping means operated in synchronism with the drive for the brake lining so as to supply the impregnating material at the proper rate. In its passage back and forth around the rollers and over the drip pans at the discharge side of the trough, the impregnating liquid is spread over the surfaces of the brake lining and surplus impregnating material on the upper side of a strip in one stretch flows over the edges and is discharged upon the other side of the brake lining in a lower stretch, thus assuring complete utilization of the impregnating material. Although the apparatus may be constructed for impregnating one brake lining strip at a time, this would not be practicable for economic reasons, and the apparatus is accordingly constructed to accommodate a plurality of strips of brake lining.

Referring to the drawings, brake lining strips 15 are supplied from a source not shown, guided between guide pins 16, projecting from a guide pin bar 17 carried by brackets 17a on the main frame, and passed between horizontal rollers 18 to one or more loose rollers 19 from which they pass downwardly to individual troughs 20 containing the impregnating material. Preferably these troughs 20 are formed as parts of a main trough divided by partitions 21 into a plurality of sections one for each strip 15 of the brake lining, and each of these troughs 20 is supplied with impregnating material through a pipe 22 from pumping apparatus to be described hereinafter. Located in each of the troughs is a treatment roller 23 supported in any suitable manner as by means of arms 24 projecting downwardly from a bar 25 supported at its opposite ends on the posts or standards 26 at the entrance side and forming part of the frame of the machine.

From the bottom of the corresponding treatment roller 23, each strip of brake lining 15 passes upwardly out of the trough, over the top of a fluted roller 27 and then downwardly back and forth around fluted rollers 28 arranged alternately at the rear and front edges of the posts 26 until it reaches the lowermost roller 28 at the rear edge of the posts 26, from which the brake lining strip passes substantially horizontally over a drip pan 29 to driving reel 30 at the discharge end of the apparatus. In order that the driving reel may have suitable engagement with the brake lining strips 15, these strips are led around the greater part of the circumference of the driving reel and then under a roller 31 from the top of which they pass out of the apparatus. The driving reel and certain of the rollers are positively driven by means to be described hereinafter.

Figure 6:
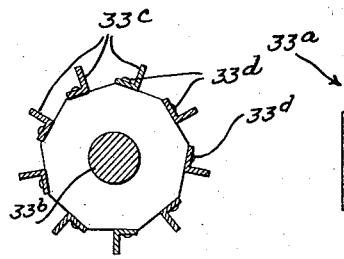
Fig. 6 is an end elevation of the driving reel around which the brake lining strips pass before leaving the apparatus.
Figure 7:
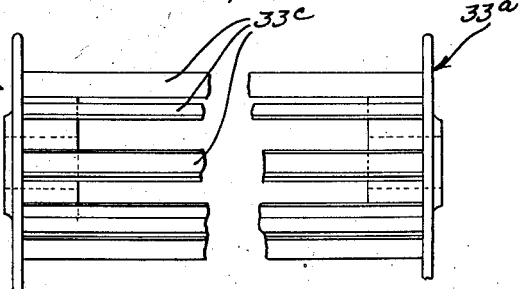
Fig. 7 is a view in front elevation illustrating the construction of the driving reel.
Figure 11:
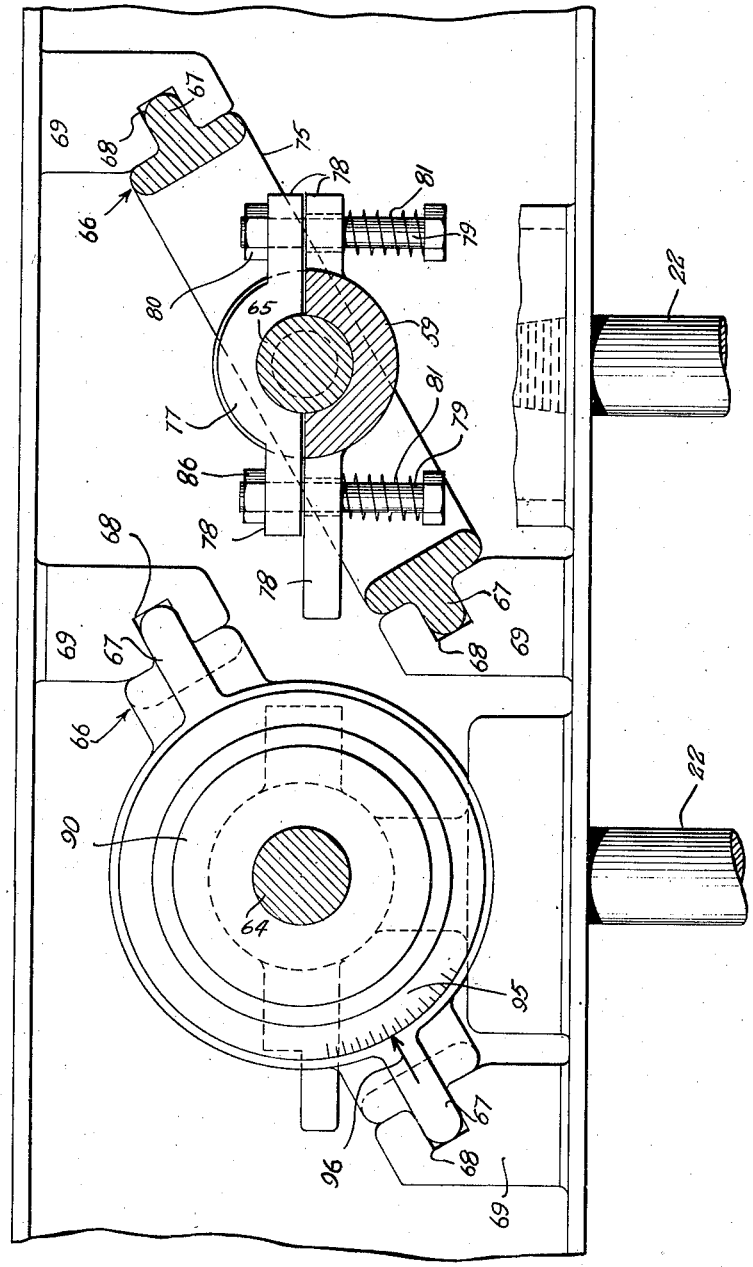
Fig. 11 is a fragmentary top plan view showing two pump units, certain of the parts being omitted and others shown in section.

As shown most clearly in Fig. 3, the treatment roller 23 is formed with a plurality of projections 32 arranged in longitudinal and also circumferential rows to enable the impregnating liquid to reach substantially all parts of the surface of the brake lining in engagement with the treatment roller. It should be understood, however, that the treatment roller may be formed in other ways and at the same time be suitable for this purpose. Also, as shown in Fig. 2, the other rollers over which the brake lining passes are fluted or formed with longitudinal grooves so as to provide longitudinal ribs or teeth 33 for engagement with the brake lining, thus leaving the surfaces of the brake lining exposed to a considerable extent. Preferably the driving reel 30 extends completely across the machine and is made up of heads 33a to be mounted on a shaft 33b and connecting members 33c in the form of angles. As shown in Figs. 6 and 7, each of the heads 33a is made up of an end disc and a projecting hub having a regular polygonal cross-section to correspond with the number of angles 33c, one flange of each angle resting on corresponding surfaces of the two hubs and being secured in position as by screws 33d. Supports similar to the hubs may be provided to stiffen the angles 33c.

The depth of the impregnating material in each trough 20 is limited by the height thereof at the side adjacent to the roller 27 and, if there is any excess of liquid over the capacity of the trough, such excess will overflow down a discharge chute or outlet 34 and be deposited upon the portion of the brake lining passing from the roller 27 to the uppermost roller 28. Adjacent to the point where the liquid from the outlet 34 falls on the brake lining, there is provided a spreader 36 which acts to spread the liquid and also to limit the amount which is carried forward on the upper surface of the brake lining at this point, any excess liquid being worked to the edges of the brake band where it falls into a drip pan 39 which also receives the drippings from the brake lining after it passes over the roller 27.

Figure 5:
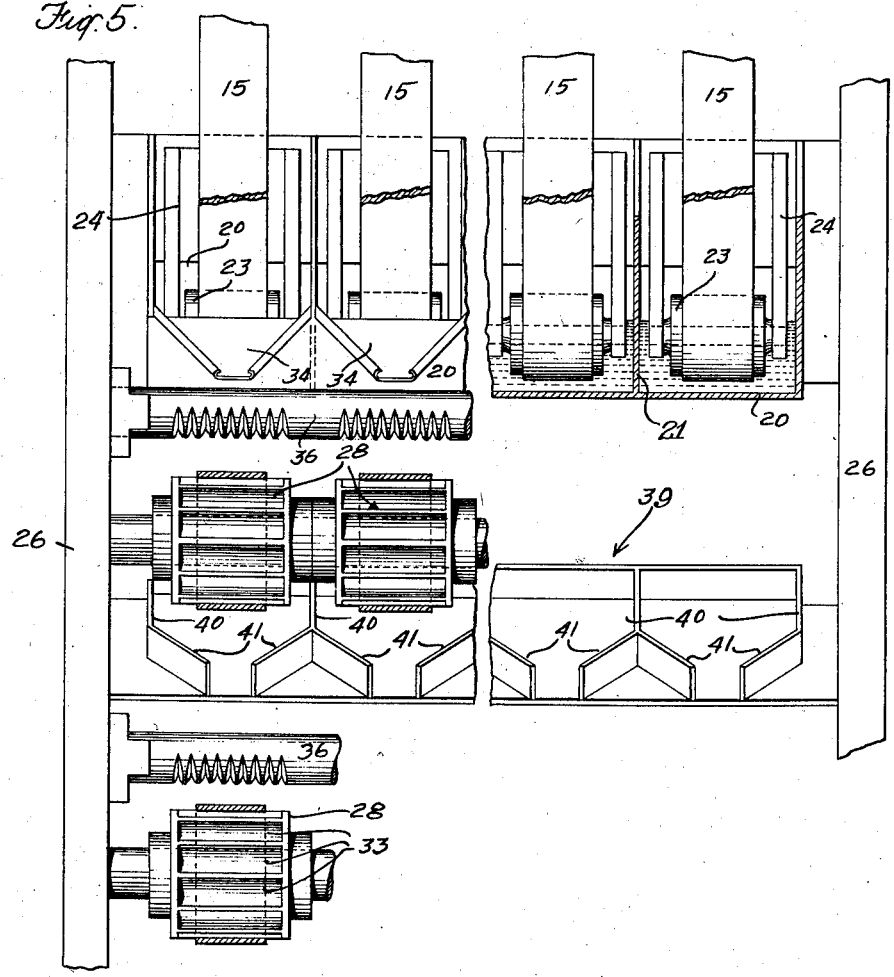
Fig. 5 is a fragmentary view at the entrance side of the machine, certain parts being omitted to show the underlying structure.

The drip pan 39 is divided into sections corresponding to the various trough sections by partitions 40 and near their lower edges the drip pans 39 are provided with converging walls 41 (Fig. 5) so that the drippings will fall on lower stretches of the brake lining strips. As shown in Fig. 1, there are four of these drip pans under successive back and forth stretches of the brake linings, and in each case the drippings fall on the brake lining just before it reaches a spreader 36. Obviously, the number of drip pans and spreaders could be increased but four of each have been found to be satisfactory.

The spreaders or spreader rods are formed with a series of grooves 42, each of which is cut with its bottom in a circle of greater radius than the radius of the circular spreader bar, thus providing grooves which are deepest at their middle points and taper off to nothing at about half way around the rods. It will be evident that by turning these spreaders to different positions the openings between the spreaders and the brake lining can be made larger or smaller to allow more or less of the material to pass therethrough. The spreaders are mounted at their ends in brackets or plates 43 connected with the posts 26, and the spreaders are held in different angular positions with reference to the brackets 43 by means of set screws 44 threaded through portions of the brackets 43 and projecting into corresponding recesses or openings 45 in the end of the spreader. The brackets 43 may also be adjustable to adjust the position of the spreader bar as by swinging it to or from the corresponding stretches of the brake lining. To this end the brackets or plates 43 are provided with arcuate slots 46 through which project bolts 47 passing through corresponding openings in the material of the posts 26. When the brackets or plates 43 are in proper adjusted position they may be secured against movement by screwing up nuts 48 on the bolts 47.

The frame of the apparatus includes, in addition to the posts 26 already mentioned, posts 50 at the discharge end of the apparatus, members 51 and 52 connecting respectively the upper ends and the lower ends of the posts 26, members 53 connecting the lower ends of the posts 26 with the lower ends of the corresponding posts 50, members 54 connecting the upper ends of the posts 26 with the upper ends of the corresponding posts 50, inclined braces 55 extending from the rear posts 50 to the members 54 and assisting the latter in supporting part of the driving mechanism, and an upwardly facing channel 56 extending between the posts 50 and serving to receive the bottom of a tank 57 from which the impregnating material in liquid form is supplied to the troughs or trough sections 20 through which the brake lining strips are led.

For supplying the impregnating material through the various pipes or tubes 22 to the corresponding trough sections, provision may be made of a plurality of pump units 58 arranged along the tank in suitable spaced relation. Each of the pump units includes a vertical barrel 59 having at an intermediate point an enlargement 60 of the bore 61 constituting a chamber which is connected through the passage 62 in a lateral extension 63 of the barrel with the corresponding pipe 22. The end of the extension 63 is securely attached to the wall of the tank 57 around an opening in said wall through which the tube or pipe 22 projects. Through its upper end the barrel 59 receives a positively actuated plunger 64 and through its lower end a plunger 65 having a lost motion connection with the plunger 64, including a vertically reciprocating frame or yoke 66, the function of which will be brought out hereinafter. Said frame 66 has vertical sides provided with external ribs 67 projecting into corresponding slots 68 in guide members 69. The guide members may be held in position in any suitable manner, as by attachment to the walls of the tank 57. At the upper end of the barrel 59 there is a countersunk recess 70 containing packing 71 which is compressed by means of a gland 72 to effect a tight seal around the plunger 64. Below the chamber 60 there is an inlet chamber 73 communicating through a passage 74 with the interior of the tank 57.

The plunger 64 is moved up and down by positively acting means and without lost motion whereas the lower plunger 65 is moved downwardly by direct engagement thereof by the plunger 64 and upwardly by the lower end 75 of the frame or yoke 66, the plunger 65 normally being held frictionally against movement by other agencies. Such frictional holding action may be obtained by providing at one side of the barrel or cylinder a slot 76 extending substantially half way around the barrel, and inserting in said slot a separate member 77 pressed towards the remaining portion of the barrel at this point in a suitable manner, as by providing corresponding perforated ears 78 on the barrel 59 and cooperating member 77, bolts 79 passing through corresponding ears, nuts 80 threaded on the ends of the bolts, and springs 81 on said bolts to press the member 77 towards the corresponding part of the barrel and grip the lower plunger 65.

As illustrated, the plunger 65 has a reduced portion 82 passing through the lower end 75 of the frame 66, and at the upper end of said reduced portion a shoulder 83 which is engaged by the frame end 75 in lifting the plunger. The plunger 65 is depressed by the plunger 64 which has the same stroke at all times and in order to prevent movement of the plunger 65 below the point to which it is moved by the plunger 64, it may be formed with a further extension 84 which is brought into engagement with the bottom of the tank 57 when the upper plunger 64 reaches the lower end of its stroke (Fig. 8).

Assuming the parts of a pump unit to be in the positions shown in Fig. 8, upward movement of the plunger 64 will effect separation thereof from the lower plunger 65 until the lower end 75 of the frame 66 engages the shoulder 83 on the lower plunger 65, the opening between the plungers being filled as fast as made by liquid entering the chamber 73 through the inlet 74. During further upward movement of the plunger 64, the plunger 65 will be moved therewith and the measured amount of liquid therebetween will be raised to the chamber 60. In the downward movement of the plunger 64 the lower plunger 65 will be held stationary until engaged by the upper plunger after all the liquid therebetween has been forced out (Fig. 10), and then will be moved downwardly by the upper plunger to its lowermost position (Fig. 8) preparatory to another cycle of operation of the pump.

To obtain the best results, the surface of liquid in the tank 57 should be kept at substantially the same level at all times. This may be done by means of a pump 85 forcing liquid from a tank 86 through a pipe 87 discharging into the top of the tank 57, and an overflow line 88 through which all liquid rising above said predetermined liquid level is returned to the tank 86. Any one of the pipes 22 may be shut off by means of a valve 89 without requiring the stoppage of the pumping means, the only difference in the action of the corresponding pump unit being that upon downward movement of the upper plunger 64 the lower plunger 65 will be forced down by the liquid pressure instead of remaining stationary until engaged directly by the upper plunger. In other words, the closing of a valve 89 in any one of the pipes 22 will cause the corresponding pump unit to idle.

It may be desirable to vary the capacity of each pump unit 58. This must, of course, be done without varying the movement of the upper plunger 64 and may be obtained by causing the lower plunger to be picked up by the frame 66 at an earlier or later stage in the upward movement of the upper plunger 64. An effective means for carrying out this purpose is illustrated in Figs. 8, 9, 10 and 11. Screwed on the upper end of the upper plunger 64 is an adjusting head 90 comprising a dial adapted for hand operation, a cylindrical portion 91 rotatable in the upper end 92 of the frame 66, and a threaded lower end 93 on which is screwed a nut or collar 94 to complete the connection between the adjusting head and the frame 66 so that the frame will be moved by the adjusting head irrespective of the direction of movement. After the nut or collar 94 has been adjusted on said threaded lower end 93 it may be secured in this position by means of a set screw 94a. The dial is provided with a suitably calibrated scale 95 which cooperates with a reference mark or pointer 96 (Fig. 11) on the frame 66. Obviously, by screwing the adjusting head up or down on the plunger 64, the distance between the plungers in their upward movement together will be decreased or increased respectively.

Operation of all the pump units in unison may be effected by connecting each of the upper plungers 64 with an arm 97 projecting from a rock shaft 98 mounted on brackets 99 carried by the tank 57, the connection between each of the plungers 64 and the corresponding arm 97 being made by a link 100 pivoted at 101 to the upper end of the plunger and at 102 to the arm. The rock shaft 98 is actuated by an arm 103 fixed thereon and connected by means of a pivot 104 at its outer end with the upper end of a link 105 which in turn is connected at its lower end with a pin 106 eccentrically mounted on a member or disc 107 fixed on a shaft 108 journalled on the top of the frame. The shaft 108 is provided with a gear 109 meshing with a larger gear 110 on a second shaft 111 journalled on the top of the frame and the shaft 111 is provided with another gear 112 meshing with a larger gear 113 on a shaft 114 also journalled on the top of the frame, whereby the shaft 108 rotates at a much greater speed than the shaft 114, which may be utilized as the driving shaft.

The driving connection between the pumping means and the means for advancing the strips of brake lining is effected by means of a flexible endless connector 115, preferably a sprocket chain, passing over a sprocket 116 fixed on the shaft 114 at the top of the frame, back and forth around sprockets 117 fixed on shafts 118 of certain sets of rollers 28 (here shown as the first and fourth sets of rollers at the left of the posts 26 in Fig. 1; and the third and sixth at the right of the posts), around the left side and bottom of a sprocket 119 loose on the shaft 120 of the set of rollers 29 at the lower end of the posts 26, around the bottom and right side of a sprocket 121 fixed on the shaft 33b of the driving reel 30, around an idler sprocket 123 on a stub shaft 124 projecting from one of the posts 50, and then back to the sprocket 116. Obviously the rollers on the shaft 114 and on the shafts 118 are fixed thereto. As illustrated in Fig. 1, slack in the sprocket chain 115 may be taken up by a take up roller 125 engaging the sprocket chain between the sprocket 116 and the first sprocket 117, the roller being mounted on one or more arms 126 pivoted at 127 on a bracket 128 provided with an arcuate slot 129 receiving the shaft or pivot 130 of the take-up roll and serving to limit the movement thereof, particularly when the sprocket chain is removed.

Preferably the apparatus is made up of one or more units, each accommodating a plurality of brake lining strips 15, and there are individual rollers for all of the strips passing through each unit until the strips reach the driving reel 30 which extends completely across the unit.

In treating brake lining strips according to the present invention, the impregnating material is supplied at a rate which corresponds with the rate of movement through the apparatus, the liquid carried along by the strips is spread over the surfaces of the strips and the amount of material in the coating is regulated, and impregnating material removed from one surface of a strip is applied to the other, thus acting to produce uniform impregnation. Also by the use of fluted rollers 27 and 28, the surface of each strip is exposed to the air to a greater extent and there is less interference with uniform distribution of the impregnating material.

It should be understood that various changes may be made in the manner of carrying out the invention and that various features may be used without others without departing from the true spirit and scope of the invention.

Having thus described my invention, what I claim is:

1. In apparatus of the class described, the combination of a trough, means for maintaining liquid at a predetermined level in said trough, and means for guiding a continuous strip through said trough including a treatment roller mounted for free rotation with its lower part beneath said predetermined level and having intersecting passages at its surface to provide communication between the body of liquid in the trough and the inner surface of the strip as it passes around the bottom of the roller, plural, approximately flat top, friction surfaces lying between said intersections.

2. In apparatus of the class described, the combination of a trough, means for maintaining liquid at a predetermined level in said trough, and means for guiding a continuous strip through said trough including a treatment roller located with its lower part beneath said predetermined level and having friction surfaces with circumferential passages at these surfaces to accommodate liquid between said roller and said strip.

3. In apparatus of the class described, the combination of a trough, means for maintaining liquid at a predetermined level in said trough, and means for guiding a continuous strip through said trough including a treatment roller located with its lower part beneath said predetermined level and having at its surface intersecting circumferential and longitudinal passages between outer frictional areas to accommodate liquid between said roller and said strip.

4. In apparatus of the class described, the combination of strip handling rollers, each of said rollers being positioned above the other, arranged in staggered relation vertically to feed a strip downwardly in successive downwardly inclined stretches, means for discharging liquid at a predetermined position on one of said stretches, and spreading means for spreading the liquid thus discharged and causing the excess to be discharged over the edges of the strip and on the lower stretch between said staggered rollers.

5. In impregnating apparatus of the class described, the combination of strip handling means to feed a strip downwardly in downwardly inclined stretches extending alternately in different directions, a spreader for cooperation with the upper surface of one of said stretches to limit the amount of impregnating material carried forward on the strip and to discharge excess of material over the edge of the strip, and an inclined drip pan beneath such stretch and having a part adapted to receive the material thus discharged over the edges of the strip and deliver it to the other side of the strip at its middle and along the next lower stretch.

6. The method of impregnating a strip, which includes the steps of feeding the strip along a predetermined path, supplying impregnating material to said strip at a predetermined position in said path and at a rate corresponding to the rate of movement of the strip, spreading the impregnating material at successive intervals alternately on opposite sides of the strip, and delivering any excess of impregnating material at one side of a strip to the opposite side thereof.

7. In apparatus of the class described, the combination of strip handling rollers arranged in staggered relation vertically to feed a strip downwardly in successively downwardly inclined stretches, and means for discharging liquid at a predetermined position on one of the upper of said stretches and a flow directing receptacle beneath another of said stretches.

8. In apparatus of the class described, the combination of strip handling rollers arranged in staggered relation vertically to feed a strip downwardly in successively downwardly inclined stretches, and a plurality of liquid collecting and discharging receptacles, one between each pair of strip stretches.

CARL P. BROCKWAY.